(12) United States Patent
Yu et al.

(10) Patent No.: US 9,161,407 B2
(45) Date of Patent: Oct. 13, 2015

(54) DIMMABLE LED DRIVER AND DRIVING METHOD

(71) Applicant: Silergy Semiconductor Technology (Hangzhou) LTD, Hangzhou, ZheJiang Province (CN)

(72) Inventors: Feng Yu, Hangzhou (CN); Xiaodong Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 260 days.

(21) Appl. No.: 13/916,182

(22) Filed: Jun. 12, 2013

(65) Prior Publication Data

US 2014/0021879 A1    Jan. 23, 2014

(30) Foreign Application Priority Data

Jul. 18, 2012   (CN) .......................... 2012 1 0249167

(51) Int. Cl.
  *H05B 37/00*   (2006.01)
  *H05B 33/08*   (2006.01)
(52) U.S. Cl.
  CPC ........ *H05B 33/0839* (2013.01); *H05B 33/0845* (2013.01); *H05B 33/0815* (2013.01); *Y02B 20/348* (2013.01)

(58) Field of Classification Search
  CPC ........................ H05B 33/0815; H05B 33/0839
  See application file for complete search history.

(56) References Cited

U.S. PATENT DOCUMENTS

| | | | | |
|---|---|---|---|---|
| 7,656,103 B2 * | 2/2010 | Shteynberg et al. | .......... | 315/312 |
| 7,667,986 B2 * | 2/2010 | Artusi et al. | ..................... | 363/16 |
| 8,212,491 B2 * | 7/2012 | Kost et al. | ...................... | 315/247 |
| 8,610,365 B2 * | 12/2013 | King et al. | ..................... | 315/246 |
| 8,736,185 B2 * | 5/2014 | Chen et al. | ..................... | 315/205 |

* cited by examiner

*Primary Examiner* — Jeffrey Zweizig
(74) *Attorney, Agent, or Firm* — Michael C. Stephens, Jr.

(57) ABSTRACT

Disclosed are dimmable LED driver circuits and methods. A dimmable LED driver can include: an SCR, an electronic transformer, and a rectifier bridge to convert an AC voltage to a DC voltage signal; a power stage circuit that receives the DC voltage signal, and outputs a constant current to drive an LED load, where the power stage circuit includes first and second power stage circuits, the first power stage circuit receiving the DC voltage signal, and generating a first output voltage to the second power stage; and an input current control circuit that receives an input current of the first power stage circuit and the first output voltage, and generates a first control signal to control the input current as a square wave signal during an on time of the SCR, and the input current is substantially zero during an off time of the SCR.

15 Claims, 8 Drawing Sheets

DIMMABLE LED DRIVER AND DRIVING METHOD

RELATED APPLICATIONS

This application claims the benefit of Chinese Patent Application No. 201210249167.2, filed on Jul. 18, 2012, which is incorporated herein by reference in its entirety.

FIELD OF THE INVENTION

The present invention relates to field of power electronics, and more particularly to a dimmable light-emitting diode (LED) driver, and a method of driving a dimmable LED.

BACKGROUND

In the lighting field, LED lights are an increasingly preferred alternative to replace traditional light sources (e.g., halogen lamps). When using LED lights to replace halogen lamps, it may be necessary to match with electronic transformers in traditional circuits to ensure normal operation of the electronic transformers. Also, accurate dimming on the LED load may be required in order to maximize advantages of energy saving and high luminous efficiency of the LED light load.

In conventional approaches, a triac dimming scheme may be utilized for dimming an LED lamp load. In an LED driver with an electronic transformer, a triac dimmer is generally placed in front of the electronic transformer. Triac dimming can be used to adjust a supply voltage for the LED lamp load by controlling a triac conducting angle, so as to realize dimming. However, conventional LED drivers generally contain a large filter capacitor, which can cause current through SCR to be uncontrollable due to LC resonance in the circuit, possibly resulting in the SCR not being able to maintain conductivity. Therefore, the LED may appear as a strobe light. In recent years, a variety of control methods using SCRs for LED dimming have also been proposed. For example, a dummy load (e.g., resistors) may be added in order to improve controllability. However, such a dummy load may lower circuit efficiency due to power consumption on the dummy load.

In addition, electronic transformers in traditional circuits were originally designed for halogen lamp (instead of LED lights) loads, so electronic transformers typically require maintaining a minimum load current during normal operation. Therefore, in an LED driver with an electronic transformer, it is difficult to ensure that the LED driver not only meets requirements of electronic transformer minimum operating current, but also can achieve accurate dimming for an LED light load to avoid LED light flash or strobe effects, and to improve circuit efficiency.

SUMMARY

In one embodiment, a dimmable light-emitting diode (LED) driver can include: (i) a silicon-controlled rectifier (SCR), an electronic transformer, and a rectifier bridge configured to convert an AC voltage to a DC voltage signal; (ii) a power stage circuit configured to receive the DC voltage signal, and to output a constant current to drive an LED load, where the power stage circuit includes first and second power stage circuits, where the first power stage circuit is configured to receive the DC voltage signal, and to generate a first output voltage to the second power stage; (iii) an input current control circuit configured to receive an input current of the first power stage circuit and the first output voltage, and to generate a first control signal to control the input current as a square wave signal during an on time of the SCR, and the input current is maintained as substantially zero during an off time of the SCR; (iv) where, during the on time of the SCR, a peak of the input current is a substantially constant value that satisfies a minimum load current requirement of the electronic transformer, and a valley of the input current is substantially zero; and (v) where the LED driver is configured to drive the LED load in accordance with the input current and the first output voltage.

In one embodiment, a method of driving a dimmable LED, can include: (i) receiving an AC voltage to obtain a DC voltage signal through a silicon-controlled rectifier (SCR), an electronic transformer, and a rectifier bridge; (ii) generating an input current and a first output voltage using the DC voltage signal, where the input current is generated as a square wave signal during an on time of the SCR, and the input current is maintained as substantially zero during an off time of the SCR; (iii) generating a dimming signal from the input current; (iv) generating a constant output current signal using the first output voltage, an LED load current signal, and the dimming signal; and (v) where, during the on time of the SCR, a peak of the input current is a substantially constant value that satisfies a minimum load current requirement of the electronic transformer, and a valley of the input current is substantially zero.

Embodiments of the present invention can advantageously provide several advantages over conventional approaches. For example, the minimum load current requirement of the electronic transformer can be satisfied during operation. In addition, a dimming signal that represents conducting angle information of the SCR can be obtained by detecting input current information of the first power stage circuit through a dimming signal generating circuit. The dimming signal can be used to realize precise dimming on the LED load. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Various benefits can be realized by utilising dimmable light-emitting diode (LED) driver circuits and methods according to particular embodiments. For example, an input current in a first power stage circuit can be controlled by an input current control circuit to be a square wave signal during a conducting or "on" time period or portion of time of a silicon-controlled rectifier (SCR) with a constant peak value that satisfies a minimum load current requirement through an electronic transformer, and zero valley value. For example, a "valley" value may be a low or minimal value of a square wave or other periodic signal.

During a turn-off time period or "off" or non-conducting time portion of the SCR, the input current can be maintained as substantially zero, to ensure the input current remains higher than a minimum load current of the electronic transformer during operation. This can ensure that the electronic transformer does not turn off during normal operation, thereby solving the flashing or strobe problem of an LED load caused due to inadvertent turn-off of the electronic transformer.

For example, the input current waveform can represent conducting angle information of the SCR, and a dimming signal representing the conducting angle information of the SCR can be obtained by detecting input current information through a dimming signal generating circuit. This can achieve precise dimming on the LED load, as well as a broad dimming range. Also, the LED load current can be controlled as substantially constant through an output current control circuit to provide stable luminance of the LED load. In addition, particular embodiments can employ a two-stage driver structure to avoid using a large filter capacitor after the bridge rectifier, and to reduce ripple current. In this way, improved stability of the SCR load current can be achieved relative to conventional approaches. Further, the two-stage structure driver can also avoid using a dummy load to obtain a high efficiency.

In one embodiment, a dimmable light-emitting diode (LED) driver can include: (i) a silicon-controlled rectifier (SCR), an electronic transformer, and a rectifier bridge configured to convert an AC voltage to a DC voltage signal; (ii) a power stage circuit configured to receive the DC voltage signal, and to output a constant current to drive an LED load, where the power stage circuit includes first and second power stage circuits, where the first power stage circuit is configured to receive the DC voltage signal, and to generate a first output voltage to the second power stage; (iii) an input current control circuit configured to receive an input current of the first power stage circuit and the first output voltage, and to generate a first control signal to control the input current as a square wave signal during an on time of the SCR, and the input current is maintained as substantially zero during an off time of the SCR; (iv) where, during the on time of the SCR, a peak of the input current is a substantially constant value that satisfies a minimum load current requirement of the electronic transformer, and a valley of the input current is substantially zero; and (v) where the LED driver is configured to drive the LED load in accordance with the input current and the first output voltage.

Figure 1:
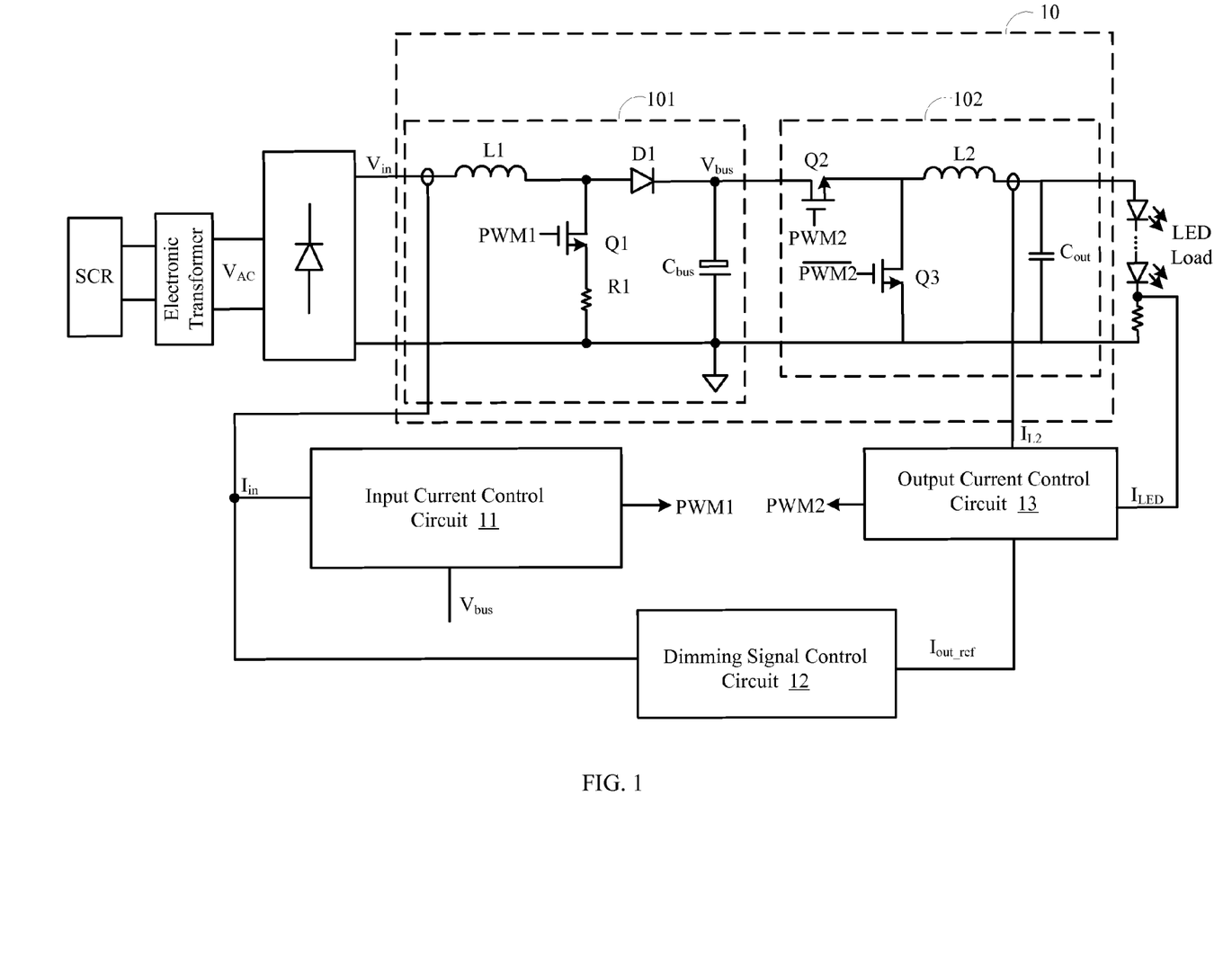
FIG. 1 shows a schematic block diagram of a first example dimmable LED driver in accordance with embodiments of present invention.

Referring now to FIG. 1, shown is a block schematic diagram of a first example dimmable LED driver in accordance with embodiments of present invention. After being processed by an SCR or other rectifier circuit or Triac, and an electronic transformer, a grid AC voltage can be input to a rectifier bridge to obtain a DC voltage signal $V_{in}$. Also, power stage circuitry 10 can be used for receiving DC voltage signal $V_{in}$ and to output a substantially constant current to drive an LED load. As shown in FIG. 1, power stage circuitry 10 can include power stage circuit 101 and power stage circuit 102. For example, power stage circuit 101 can be a first stage boost circuit, and may include inductor $L_1$, diode $D_1$, switch $Q_1$, and output capacitor $C_{bus}$.

For example, stage circuit 102 can be a second stage buck topology circuit, and may include inductor $L_2$, switch $Q_2$, switch $Q_3$, and output capacitor $C_{out}$. Power stage circuit 101 can receive DC voltage signal $V_{in}$, and convert $V_{in}$ to output voltage $V_{bus}$ that can be supplied to power stage circuit 102. Power stage circuit 101 can be a boost topology, and power stage circuit 102 can be buck topology or boost-buck topology. However, these power stage circuits can also be any suitable topology in particular embodiments. This particular example dimmable LED driver can also include input current control circuit 11, dimming signal generating circuit 12, and output current control circuit 13.

In particular embodiments, input current control circuit 11 can be used for receiving input current $I_{in}$ of power stage circuit 101 and output voltage $V_{bus}$, and may generate control signal PWM1. Control signal PWM1 can be used for controlling input current to be a square wave signal during a conducting or on time of the SCR. The current peak of the square wave signal can be a substantially constant value that satisfies a minimum load current requirement of electronic transformer, while the current valley or low point of the square wave signal can be essentially zero. When the SCR is off, input current can be kept at zero. Input current $I_{in}$ of power stage circuit 101 can be obtained by sampling current of inductor $L_1$, and may be configured as a load current of the electronic transformer. In particular, control signal PWM1 can control input current $I_{in}$ and output voltage $V_{bus}$ by controlling a switching operation of switch $Q_1$.

Dimming signal generating circuit 12 can receive input current $I_{in}$ of power stage circuit 101 and May output dimming signal $I_{out\_ref}$ that represents conducting angle information of the SCR. Output current control circuit 13 can receive current signal $I_{LED}$ of the LED load and dimming signal $I_{out\_ref}$ from dimming signal generating circuit 12 to generate control signal PWM2 for controlling power stage circuit 102 to provide a substantially constant output current signal for LED load. In this way, dimming may be realized for the LED load. More specifically, control signal PWM2 can control a switching operation of switch $Q_2$, and an inverted version of control signal PWM2 can control a switching operation of switch $Q_3$, to realize substantially constant current control and brightness adjustment of the LED load.

By controlling input current of power stage circuit 101 to be a square wave signal during an on time of the SCR, a peak value can be a substantially constant value to meet minimum load current requirements of the electronic transformer, and the current valley of the square wave signal can be essentially zero. During an off time of the SCR, input current can be maintained at essentially zero. In this way, input current can be ensured to meet minimum load current requirements of the electronic transformer during normal operation, and to maintain the electronic transformer in a normal operating state. This approach a particular embodiments can solve problems caused by LED blinks or strobe action due to inadvertent turn-off of electronic transformer.

In addition, a waveform of the input current may represent conducting angle information of the SCR. Therefore, dimming signal generating circuit 12 can be used to address the adjusting of brightness of the LED load in the exemplified two-stage circuit. Dimming signal generating circuit 12 can generate a dimming signal that represents conducting angle information of the SCR by detecting input current information, so as to adjust brightness of LED load accordingly. In this way, particular embodiments can achieve substantially constant current control and brightness regulation of LED load in a two-stage circuit, as well as high precision control and broad dimming scope.

Figure 2:
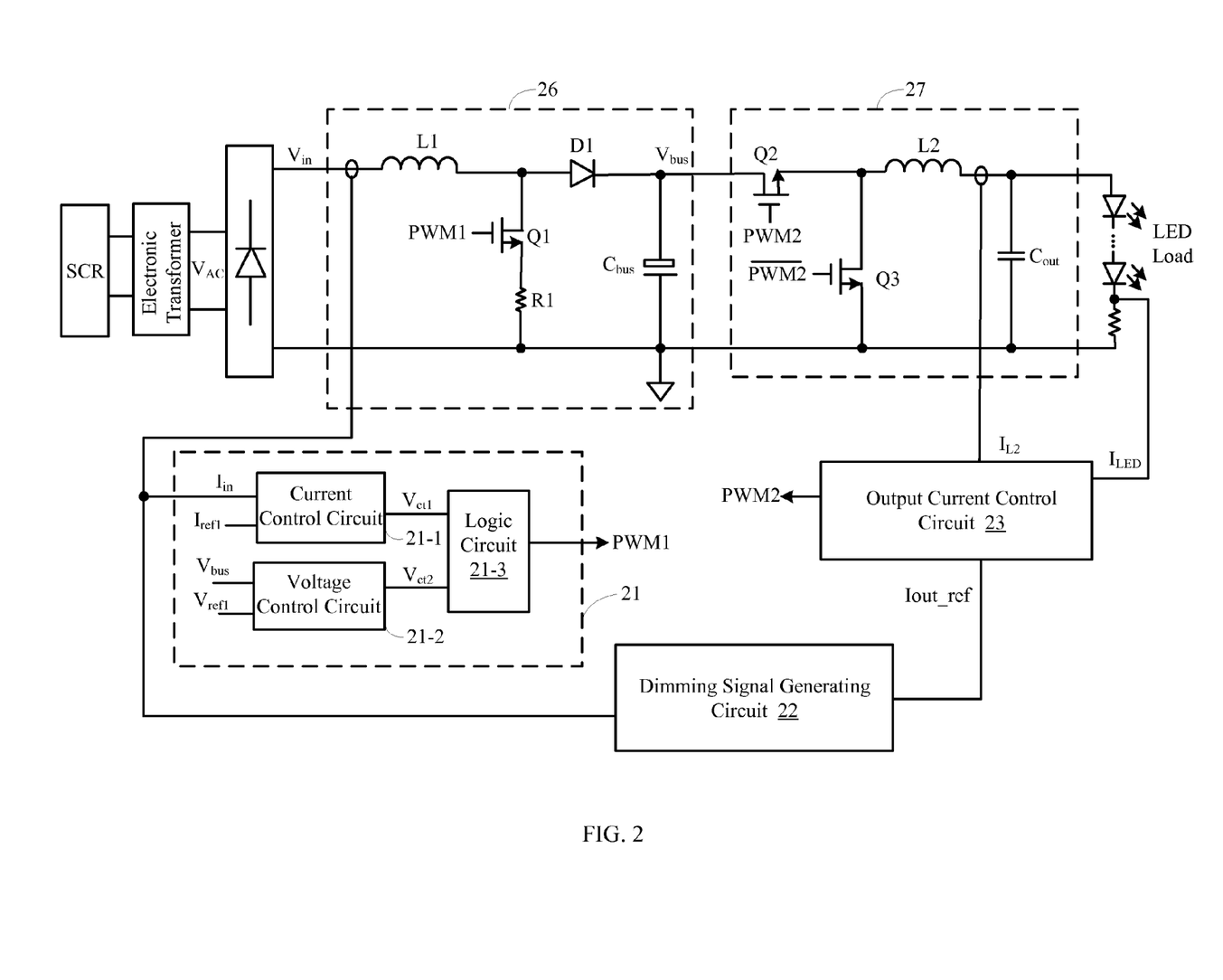
FIG. 2 shows a schematic block diagram of a second example dimmable LED driver in accordance with embodiments of present invention.

Referring now to FIG. 2, shown is a schematic block diagram of a second example dimmable LED driver in accordance with embodiments of the present invention. In this example, input current control circuit 21 can include current control circuit 21-1, voltage control circuit 21-2, and logic circuit 21-3. For example, current control circuit 21-1 can receive input current $I_{in}$ and reference current $I_{ref1}$, and may generate current control signal $V_{ct1}$. Reference current $I_{ref1}$ can correspond to a peak value of square wave signal that represents input current $I_{in}$. Voltage control circuit 21-2 can receive output voltage $V_{bus}$ and reference voltage $V_{ref1}$, and may generate voltage control signal $V_{ct2}$. Logic circuit 21-3 can receive current control signal $V_{ct1}$ and voltage control signal $V_{ct2}$, and may generate control signal PWM1 after performing a logic operation.

In this particular embodiment, when the SCR is turned on at a certain angle, power stage circuit 26 (e.g., a first stage boost circuit) can absorb power from the input side and begin to operate. Then, voltage control circuit 21-2 can generate voltage control signal $V_{ct2}$ to control output voltage $V_{bus}$ to fluctuate within a relatively small voltage range, for minimal ripple on $V_{bus}$. Also, when output voltage $V_{bus}$ reaches an upper limit value of the desired voltage range, voltage control circuit 21-2 can control power switch $Q_1$ to turn off. Therefore, power stage circuit 26 can operate in a discontinuous operating mode. Thus, input current $I_{in}$ can be in a shape of a plurality of pulses, such as square wave signal(s).

Also, during operation of power stage circuit 26, current control circuit 21-1 can form a peak of square wave signal as substantially constant, where the constant value can be determined according to reference current $I_{ref1}$. In this example, reference current $I_{ref1}$ can be set as slightly greater than the minimum load current of electronic transformer, so that peak of square wave signal can meet minimum load current requirements of the electronic transformer. On other hand, when power stage circuit 26 stops operating, input current $I_{in}$ may drop to zero such that the valley value of square wave signal can be zero. Thereafter, when the SCR is turned off, input current $I_{in}$ can be maintained at essentially zero.

Thus, as can be seen from above operating process, an LED driver in particular embodiments may not need to change circuit structures of the SCR and electronic transformer that are found in conventional circuitry. Instead, particular embodiments may control input current $I_{in}$ of power stage circuit 26 through input current control circuit 21-1. Thus, the input current can meet minimum load current requirements of electronic transformers, and they enable the electronic transformer to operate normally. Also, the input current waveform can represent conducting angle information of the SCR, and therefore can be used as an input signal of a latter-stage dimming signal generating circuit (e.g., 22), to generate a dimming signal that represents the conducting angle of SCR.

Figure 3:
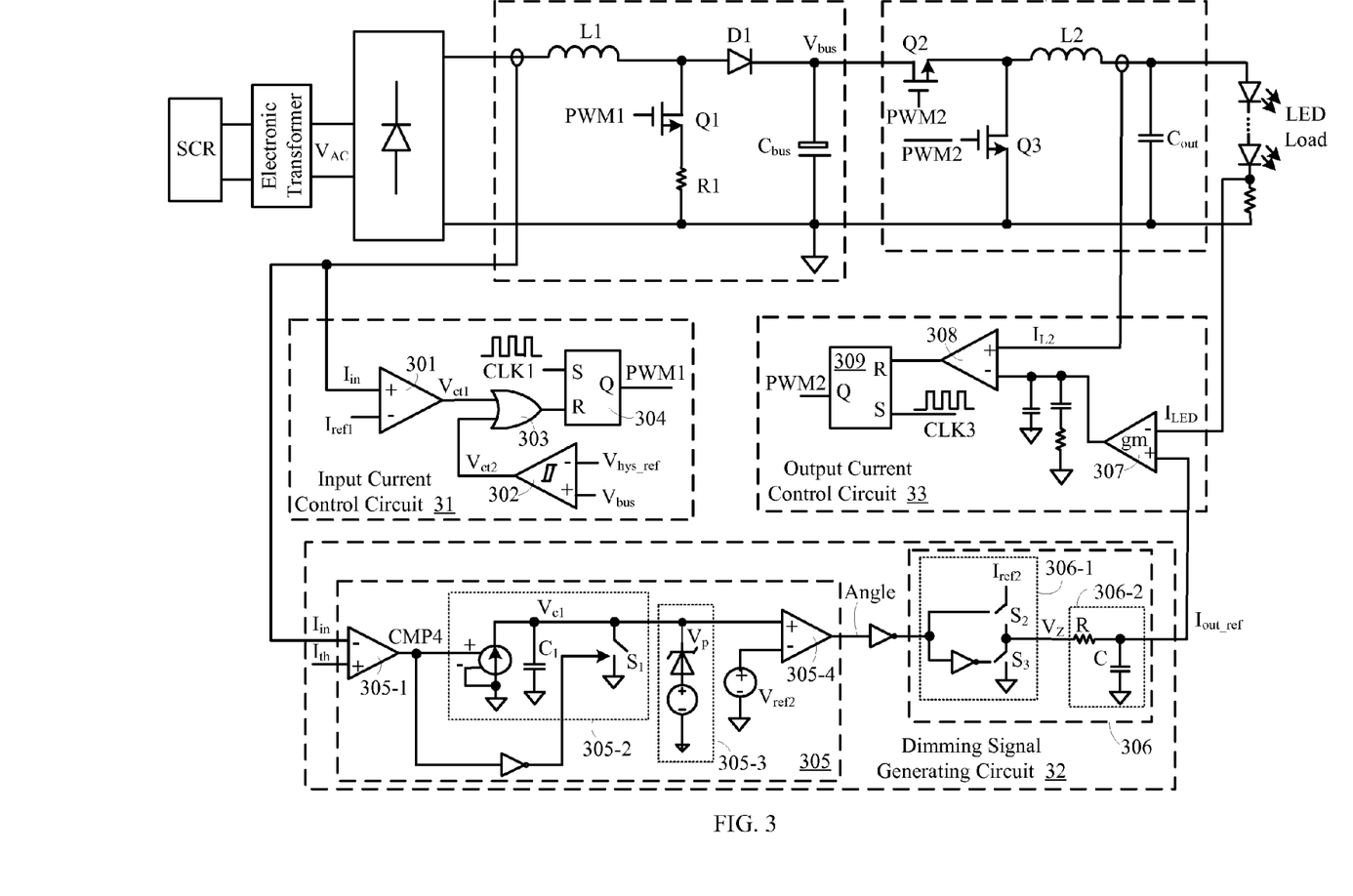
FIG. 3 shows an example circuit structure diagram of a dimmable LED driver in accordance with embodiments of present invention.

Referring now to FIG. 3, shown is an example circuit structure diagram of a dimmable LED driver in accordance with embodiments of present invention. Here, input current control circuit 31 is one example implementation of input current control circuit 21 in FIG. 2. Current control circuit 21-1 can include comparator 301, and a non-inverting input terminal of comparator 301 can receive input current $I_{in}$, while in inverting input terminal can receive reference current $I_{ref1}$. By comparing reference current $I_{ref1}$ against input current $I_{in}$, a comparison signal can be generated as current control signal $V_{ct1}$. Alternatively, considering the influence of a changing duty cycle of a switch on the input current, the non-inverting input terminal of comparator 301 may receive a superimposed signal of reference current $I_{ref1}$ and a ramp signal, so as to improve stability of sampled input current.

Voltage control circuit 21-2 can include hysteresis comparator 302. A non-inverting input terminal of hysteresis comparator 302 can receive output voltage $V_{bus}$, and the inverting input terminal can receive reference voltage $V_{ref1}$. In this particular example, hysteresis comparator 302 can receive hysteresis reference voltage $V_{hys\_ref}$ as reference voltage $V_{ref1}$, and may generate a hysteresis comparison signal. The hysteresis comparison signal can be configured as voltage control signal $V_{ct2}$, where hysteresis comparator 302 has a hysteresis width set by an upper limit threshold voltage $V_H$ and lower limit threshold voltage $V_L$.

Logic circuit 21-3 in this particular example can include OR-gate 303 and flip-flop 304. For example, flip-flop 304 can be an RS type flip-flop. Current control signal $V_{ct1}$ and voltage control signal $V_{ct2}$ can be input to a reset terminal of flip-flop 304 via the logic operation of first OR-gate 303. The set terminal of flip-flop 304 can receive clock signal CLK1, and the output terminal can output control signal PWM1 to control a switching operation of switch $Q_1$ in power stage circuit 26.

Dimming signal generating circuit 32 in this example can include timing circuit 305 and averaging circuit 306. Timing circuit 305 can receive input current $I_{in}$ of power stage circuit 26 and threshold current $I_{th}$, and output square wave signal "Angle" that represents conducting angle information of SCR. Averaging circuit 306 can receive reference current $I_{ref2}$ and square wave signal Angle, and can generate a relatively smooth dimming signal $I_{out\_ref}$ that represents the conducting angle signal of SCR by averaging reference current $I_{ref2}$ in accordance with square wave signal Angle. For example, threshold current $I_{th}$ can be set to be a value between zero and input current $I_{in}$.

Timing circuit 305 in this particular example can include comparator 305-1, charge-discharge circuit 305-2, clamp circuit 305-3, and comparator 305-4. For example, the inverting input terminal of comparator 305-1 can receive input current $I_{in}$, and the non-inverting input terminal can receive threshold current $I_{th}$. The output terminal of comparator 305-1 can output comparison signal CMP4 to be used for controlling the charge-discharge operation of charge-discharge circuit 305-2.

Charge-discharge circuit 305-2 can include parallel connected voltage-controlled current source, capacitor $C_1$, and switch $S_1$. Comparison signal CMP4 can be used to control the voltage-controlled current source so as to provide charging current for capacitor $C_1$. Also, after being inverted, comparison signal CMP4 can be used to control a switching operation of switch $S_1$ to control charge-discharge operation of capacitor $C_1$. The voltage across capacitor $C_1$ can be capacitor voltage $V_{c1}$ as shown.

Clamp circuit 305-3 may utilize clamp voltage $V_p$ to clamp first capacitor voltage $V_{c1}$. In this particular example, clamp circuit 305-3 can include a voltage source and a zener diode, and the clamp voltage $V_p$ can be a sum of the voltage source voltage and the breakdown voltage of the zener diode. When capacitor voltage $V_{c1}$ is greater than clamp voltage $V_p$, clamp circuit 305-3 can clamp the voltage of capacitor $C_1$ to clamp voltage $V_p$, and clamp voltage $V_p$ can be transmitted to comparator 305-4 as a comparative voltage signal. When capacitor voltage $V_{c1}$ is less than clamp voltage $V_p$, capacitor voltage $V_{c1}$ can be transmitted to comparator 305-4 as the comparative voltage signal. Also, the non-inverting input terminal of comparator 305-4 can receive the comparative voltage signal, the inverting input terminal of comparator 305-4 can receive reference voltage $V_{ref2}$, and the output terminal of comparator 305-4 can output square wave signal Angle.

In this example, averaging circuit 306 can include chopper circuit 306-1 having switches $S_2$ and $S_3$, and RC filter circuit 306-2. Chopper circuit 306-1 can receive reference current $I_{ref2}$ and square wave signal Angle, and may output chopper signal $V_Z$ by "chopping" reference current $I_{ref2}$. The switching state of switch $S_2$ can be controlled by an inverted version of square wave signal Angle, and the switching state of switch $S_3$ can be controlled by square wave signal Angle. RC filter circuit 306-2 can receive chopper signal $V_Z$, and may output a relatively smooth dimming signal $I_{out\_ref}$ that represents conducting angle information of the SCR after a filter process.

Output current control circuit 33 in this example can receive LED load current signal $I_{LED}$ and dimming signal $I_{out\_ref}$ from dimming signal generating circuit 32, and may generate control signal PWM2. Control signal PWM2 can be used for controlling the power stage circuit 27 to provide a substantially constant output current signal for the LED load, and to realize LED load dimming. For example, output current control circuit 33 can include a current regulating circuitry and a flip-flop. For example, flip-flop 309 can be an RS type of flip-flop. One current regulating circuit can include transconductance operational amplifier 307 with a non-inverting input terminal receiving dimming signal $I_{out\_ref}$ and an inverting input receiving LED load current signal $I_{LED}$, and an output terminal that outputs a current adjusting signal.

Another current regulating circuit can include comparator 308 with an inverting input terminal that receives the current adjusting signal compensated by a compensation circuit, and a non-inverting input terminal that receives inductor current signal $I_{L2}$ in power stage circuit 27. Comparator 308 may output another current adjusting signal as a reset terminal of flip-flop 309. The set terminal of flip-flop 309 can receive clock signal CLK3, and the output of flip-flop 309 can be control signal PWM2 for controlling a switching operation of switch $Q_2$ in the power stage circuit 27. Also, an inverted version control signal PWM2 can be used for controlling the switching operation of switch $Q_3$, so as to achieve substantially constant current control and brightness adjustment for the LED load.

Figure 4:
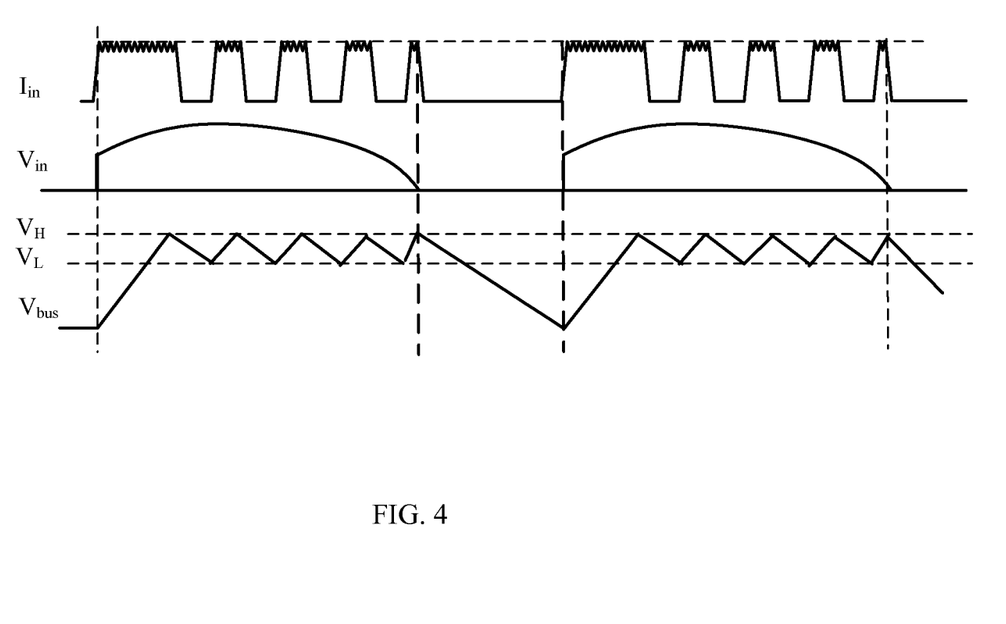
FIG. 4 shows an example operation waveform diagram of an input current control circuit of the dimmable LED driver shown in FIG. 3, in accordance with embodiments of present invention.
Figure 5:
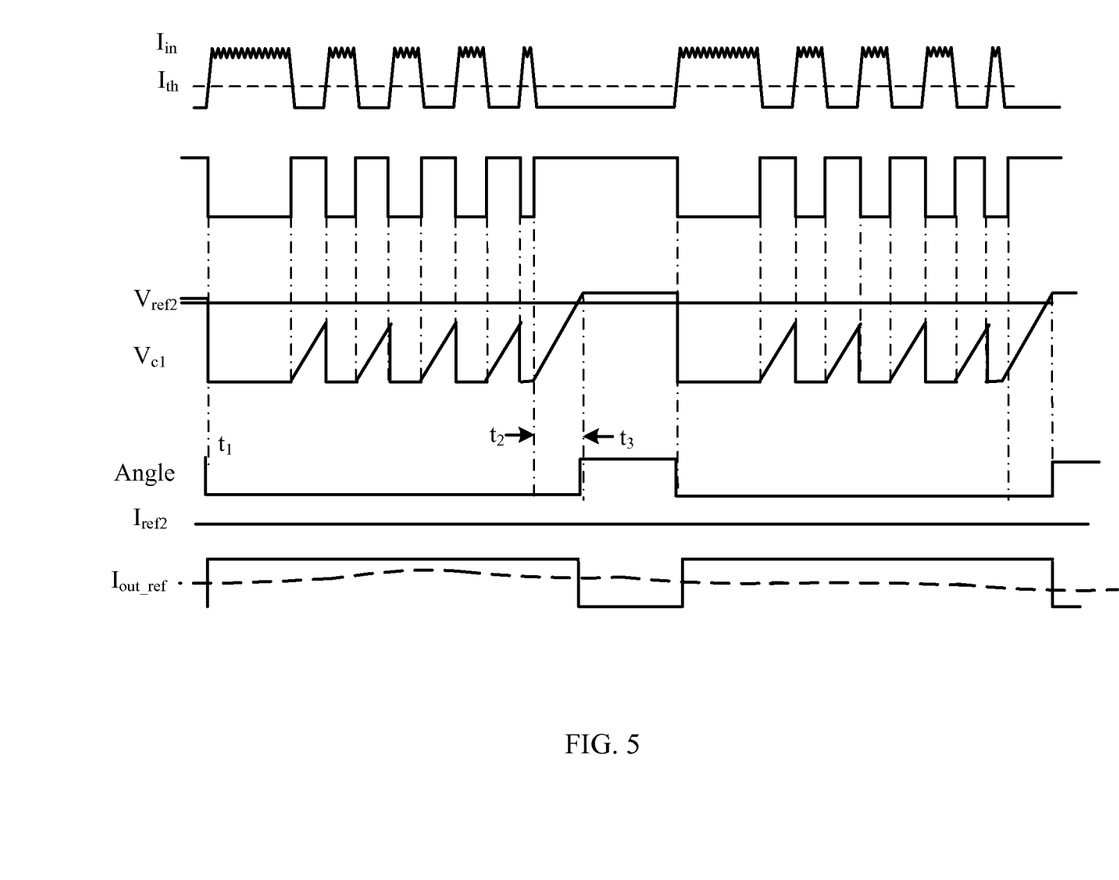
FIG. 5 shows an example operation waveform diagram of a dimming signal generating circuit of dimmable LED driver shown in FIG. 3, in accordance with embodiments of present invention.

The following further describes example operation of the above described LED drivers in conjunction with operation waveform diagrams of FIGS. 4 and 5. FIG. 4 shows an operation waveform diagram of an input current control circuit of the dimmable LED driver of FIG. 3, in accordance with embodiments of the present invention. FIG. 5 shows an operation waveform diagram of a dimming signal generating circuit of the dimmable LED driver of FIG. 3, in accordance with embodiments of the present invention.

Input current control circuit 31 operation will be described herein. When the SCR is turned on at a certain phase angle, the power stage circuit 26 can absorb power from the AC power supply, and input current $I_{in}$ can be gradually increased. Output voltage $V_{bus}$ output by the power stage circuit 26 can also gradually increase. When input current $I_{in}$ reaches a level of reference current $I_{ref1}$, or input current $I_{in}$ reaches a level of a superimposed signal of reference current $I_{ref1}$ and a ramp signal, the output of comparator 301 may go high, and switch $Q_1$ can be turned off by the RS flip-flop 304 so that input current $I_{in}$ may decrease.

When high-frequency clock signal CLK1 triggers the output of first RS flip-flop 304 to go high, then control signal PWM1 can control switch $Q_1$ to turn on again so as to achieve a substantially constant current control of input current $I_{in}$. Thus, in the operating state of the power stage circuit 26, input current $I_{in}$ can be configured as the load current of the electronic transformer. As long as input current $I_{in}$ is controlled to be higher than the minimum load current of the electronic transformer, the electronic transformer during this period can remain on and operate normally. In this particular example, reference current $I_{ref1}$ can set to be slightly higher than the minimum load current of the electronic transformer, so as to ensure normal operation of the electronic transformer.

As described above, after the SCR is turned on, output voltage $V_{bus}$ may increase gradually. When output voltage $V_{bus}$ rises to a level of upper limit voltage $V_H$ of hysteresis comparator 302, hysteresis comparison signal $V_{ct2}$ output by hysteresis comparator 302 may go high. Control signal PWM1 output by RS flip-flop 304 can control switch $Q_1$ to turn off, and input current $I_{in}$ may continue decrease until reaching zero, when power stage circuit 26 may stop operating. When output voltage $V_{bus}$ drops to the lower limit voltage $V_L$ of hysteresis comparator 302, hysteresis comparison signal $V_{ct2}$ may go low, clock signal CLK1 at the set terminal of the RS flip-flop 304 can control switch $Q_1$ to turn on again, and input current $I_{in}$ and output voltage $V_{bus}$ can increase.

This operation as described above can be repeated. As can be seen from FIG. 4, during the conducting or on time of the SCR, output voltage $V_{bus}$ may vary within a relatively small hysteresis voltage range through hysteresis control. Thus, output voltage $V_{bus}$ may have a relatively small ripple, thereby avoiding LED load flashing or strobe. Also, from FIG. 4 it can be seen that the fluctuation range of output voltage $V_{bus}$ can be relatively small, so capacitor $C_{bus}$ can be a relatively small capacitance to maintain output and reduce circuit costs.

The input current control circuit 31 can carry out hysteresis control on output voltage $V_{bus}$ of the power stage circuit 26. During the on time of the SCR, power stage circuit 26 may operate in a discontinuous operating state, and input current $I_{in}$ of the power stage circuit 26 can be a multi-pulse output. From FIG. 4, it can be seen that the input current waveform can be a square wave signal with a peak value that is substantially constant and greater than the minimum load current of the electronic transformer, and with a valley value of essentially zero. After the SCR is turned off, input current $I_{in}$ can remain at zero.

As shown in FIG. 5, input current $I_{in}$ can be a multi-pulse output. When the SCR is turned on, at time $t_1$, input current $I_{in}$ can be higher than threshold current $I_{th}$, and comparison signal CMP4 can be low. The voltage controlled current source may not generate an output current, and comparison signal CMP4 can be inverted to be high to control switch $S_1$ to turn on, and capacitor $C_1$ may start discharging. When capacitor voltage $V_{c1}$ drops to less than reference voltage $V_{ref2}$, square wave signal Angle may go low. Then, switch $Q_1$ can be turned off, and input current $I_{in}$ may decrease. When input current $I_{in}$ is less than threshold current $I_{th}$, comparison signal CMP4 may go high. At this time, switch $S_1$ may turn off, and the voltage controlled current source can be used to charge capacitor $C_1$. Capacitor voltage $V_{c1}$ may rise accordingly but still be less than reference voltage $V_{ref2}$.

Until time $t_2$, the SCR is turned off, and no input current may be generated in power stage circuit 26, and comparison signal CMP4 may remain high. Also capacitor $C_1$ can be continuously charged so capacitor voltage $V_{c1}$ can continuously rise. When capacitor voltage $V_{c1}$ increases to a level of reference voltage $V_{ref2}$ (e.g., at time $t_3$ in FIG. 5), square wave signal Angle may go high, and capacitor voltage $V_{c1}$ can keep rising. When capacitor voltage $V_{c1}$ is greater than clamp voltage $V_p$ of clamp circuit 305-3, the clamp circuit can clamp capacitor voltage $V_{c1}$ to clamp voltage $V_p$. In this particular example, reference voltage $V_{ref2}$ can be set to make the charging time ratio of capacitor $C_1$ to be longer than the time when the square wave signal is low, and clamp voltage $V_p$ can set to be slightly higher than reference voltage $V_{ref2}$.

As can be seen from above process, during the conducting or on time of the SCR, capacitor voltage $V_{c1}$ can be less than reference voltage $V_{ref2}$, and square wave signal Angle can remain low. As can be seen from FIG. 5, there is a certain offset time $\Delta t = t_3 - t_2$ between the low period of the square wave signal Angle and actual conducting time of the SCR, and the offset time may be a fixed value representing the charging time for charging capacitor $C_1$ to reach reference voltage $V_{ref2}$. The offset time may not affect square wave signal Angle to represent the conducting time of the SCR.

Within a half switching period, the on time of the SCR can correspond to its conducting angle information. For example, square wave signal Angle can represent the conducting angle of the SCR, and then Angle can be converted to the relatively smooth dimming signal that represents the conducting angle of the SCR through averaging circuit 306. Chopper circuit 306-1 can receive reference current $I_{ref2}$ and the square wave signal Angle, and may provide a relatively smooth dimming signal $I_{out\_ref}$ that represents the conducting angle of the SCR after chopping and filtering via 306-2. Therefore, dimming signal $I_{out\_ref}$ can be coupled to output current control circuit 33 to realize brightness adjustment of LED load.

Based on the above description, the input current can be controlled by the input current control circuit to be a square wave signal during an on time of the SCR, with a fixed peak value that is substantially constant and larger than a minimum load current of the electronic transformer. Also, through hysteresis, a fluctuation range of the output voltage $V_{bus}$ can be controlled to be relatively small to provide a relatively good operating voltage for power stage circuit 27. The dimming signal generating circuit 32 can obtain a square wave signal that corresponds to the conducting time of the SCR, and to further provide a dimming signal that represents the conducting angle information of the SCR, thereby realizing brightness adjustment of LED load in the two-stage circuit.

In this way, LED dimmer control of particular embodiments can not only meet requirements of minimum operating current of the electronic transformer to avoid LED light strobe, but may also can realize accurate dimming of the LED load. Further, particular embodiments may achieve substantially constant current control and brightness adjustment of LED. Also, components consuming large power (e.g., a dummy load) may not be needed in particular embodiments, thus increasing LED driver efficiency, as compared to conventional approaches.

Figure 6:
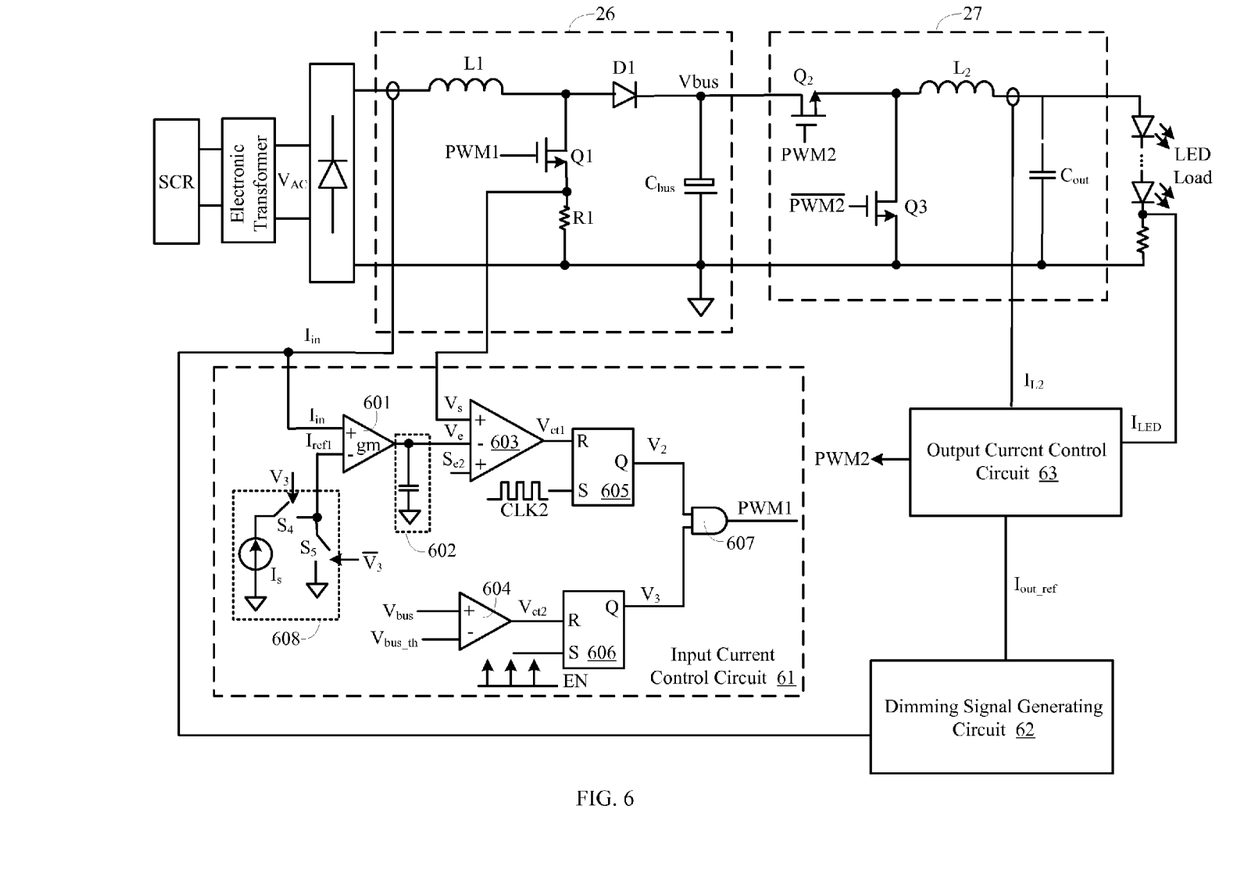
FIG. 6 shows a schematic block diagram of a third example dimmable LED driver in accordance with embodiments of present invention.

Referring now to FIG. 6, shown is a schematic block diagram of a third example dimmable LED driver in accordance with embodiments of the present invention. In this example, the dimming signal generating circuit and output current control circuit are similar to those in above examples. However, implementation of the input current control circuit 61 in the present example may differ as compared to above examples, while dimming signal generating circuit 62 in FIG. 6 can be the same as dimming signal generating circuit 32 in FIG. 3, and output current control circuit 63 can be the same as output current control circuit 33 in FIG. 3.

In the example of FIG. 6, input current control circuit 61 can include a current control circuit, a voltage control circuit, and a logic circuit. The current control circuit can include transconductance operational amplifier 601, compensation circuit 602, and comparator 603. The non-inverting input of the transconductance operational amplifier 601 can receive input current $I_{in}$ and the inverting input terminal can receive reference current $I_{ref1}$, and operational amplifier 601 can output an error current signal. This error current signal can form error voltage signal $V_e$ after being compensated by compensation circuit 602.

Reference current generating circuit 608 can be used for generating reference current $I_{ref1}$. Reference current generating circuit 608 can receive reference current source $I_s$, and when the square wave signal that represents input current $I_{in}$ in power stage circuit 26 is active, reference current source $I_s$ can be configured as reference current $I_{ref1}$. When the square wave signal is inactive, reference current $I_{ref1}$ can be zero. In this particular example, reference current generating circuit 608 can achieve control on reference current $I_{ref1}$ by a switch circuit that includes switches $S_4$ and $S_5$. For example, a switching state of switch $S_4$ can be controlled by trigger signal $V_3$, and a switching state of switch $S_5$ can be controlled by an inverted version of trigger signal $V_3$.

The inverting input terminal of comparator 603 can receive error voltage signal $V_e$, and the non-inverting input terminal can receive voltage signal $V_s$ that represents the inductor current in power stage circuit 26, or can receive a superimposed signal of voltage signal $V_s$ and a ramp signal $S_{e2}$. Similarly, ramp signal $S_{e2}$ can be used to guarantee better stability of sampling voltage signal $V_s$. The output terminal of comparator 603 can provide a comparison signal as current control signal $V_{ct1}$.

The voltage control circuit can include comparator 604, and the non-inverting input terminal of comparator 604 can receive output voltage $V_{bus}$. The inverting input terminal of comparator 604 can receive a reference voltage (e.g., threshold voltage $V_{bus\_th}$. The comparison signal may be output from comparator 604 as voltage control signal $V_{ct2}$. Also, the logic circuit can include flip-flops 605 and 606, and AND-gate 607. Each of flip-flops 605 and 606 can be RS type flip-flops. The reset terminal of the flip-flop 605 can connect current control signal $V_{ct1}$, and the set terminal can connect to clock signal CLK2, while flip-flop 605 outputs trigger signal $V_2$. The reset terminal of the flip-flop 606 can receive voltage control signal $V_{ct2}$ and the set terminal can receive an enable trigger signal EN, while flip-flop 606 outputs trigger signal $V_3$. Control signal PWM1 can be output from AND-gate 607 according to the trigger signals, and control signal PWM1 can be used for controlling the switching operation of switch $Q_1$ in the power stage circuit 26.

Figure 7:
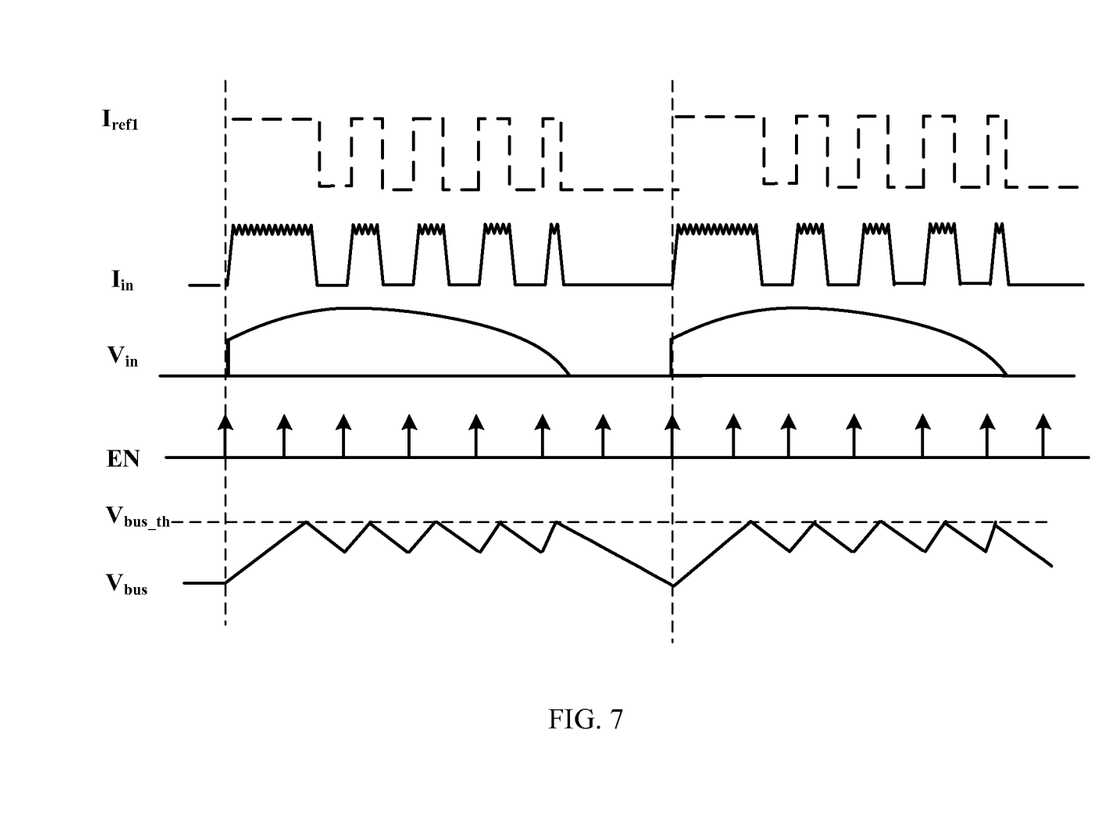
FIG. 7 shows an example operation waveform diagram of an input current control circuit of dimmable LED driver shown in FIG. 6, in accordance with embodiments of present invention.

The following may describe the operating process of the input current control circuit in accordance with embodiments of the present invention, in conjunction with the operational waveform diagram of FIG. 7. FIG. 7 shows one example operational waveform diagram of the input current control circuit of an example dimmable LED driver as shown in FIG. 6.

After the SCR conducts in a certain phase angle, power stage circuit 26 can absorb power from the AC power supply side. In this case, input current $I_{in}$ can be gradually increased, while output voltage $V_{bus}$ of power stage circuit 26 can be gradually increased. In this case, trigger signal $V_3$ can be high, switch $S_4$ can be turned on, and switch $S_5$ can be turned off. Reference current value $I_s$ can be as reference current $I_{ref1}$, and transconductance operational amplifier 601 can receive input current $I_{in}$ and reference current $I_{ref1}$, and a output error voltage signal $V_e$. When a superimposed signal of voltage signal $V_s$ that represents inductor current in power stage circuit 26 and ramp signal $S_{e2}$ reaches a level of error voltage signal $V_e$, the output of comparator 603 goes high, and the RS flip-flop 605 output may go low. AND-gate 607 can output control signal PWM1 to control switch $Q_1$ to turn off, and input current $I_{in}$ decreases.

When a pulse of high-frequency clock signal CLK2 arrives, RS flip-flop 605 output can go high. In this case, when the output of RS flip-flop 606 goes high, AND-gate 607 can output control signal PWM1 to control switch $Q_1$ to turn on, and input current $I_{in}$ can be gradually increased. By repeating the cycle, input current $I_{in}$ can be maintained as substantially constant. In order to meet current requirements of the electronic transformer, reference current source $I_s$ can be set to be slightly larger than the minimum load current of the electronic transformer, so that input current $I_{in}$ can be maintained higher than the minimum load current during the operation of the power stage circuit 26. In this way, the electronic transformer may not be turned off to avoid flashing or a strobe effect of the LED load.

Thereafter, when output voltage $V_{bus}$ gradually increases to a level of threshold voltage $V_{bus\_th}$, the output of the comparator 604 may go high, and the output of the RS flip-flop 606 may go low. Thus, control signal PWM1 can control switch $Q_1$ to turn off, and input current $I_{in}$ can continue to decrease to zero. Also, power stage circuit 26 may stop operating, so output voltage $V_{bus}$ may gradually decrease. Also, since trigger signal $V_3$ is low, switch $S_4$ can be turned off, switch $S_5$ can be turned on, and reference current $I_{ref2}$ can be zero. Therefore, error voltage $V_e$ output by transconductance operational amplifier 601 can remain unchanged, and the output of comparator 603 can be low.

When clock signal CLK2 arrives, the output of the flip-flop 605 can be high. The output of RS flip-flop 606 may go high when enable trigger signal EN arrives. Then, AND-gate 607 can output control signal PWM1 to control switch $Q_1$ to turn on, and output current $I_{in}$ may continue to rise. Correspondingly, output voltage $V_{bus}$ may also increase. By repeating the operation cycle, output voltage $V_{bus}$ can fluctuate within a small range and the LED load may not flash/strobe.

By controlling the enable trigger signal of the voltage control circuit, during the conducting time period of SCR, power stage circuit 26 can operate in a discontinuous operation state, and input current $I_{in}$ in power stage circuit 26 can be in a shape of multi-pulse output. As can be seen from FIG. 7, the waveform of the input current can also be a square wave signal, as discussed above. Also, dimming signal generating circuit 62 can generate a square wave signal corresponding to the SCR conducting time by sampling input current $I_{in}$, and further obtaining a dimming signal that represents the conducting angle information of the SCR for diming the latter stage. Particular embodiments can also achieve accurate dimming of the LED lamp load with a relatively wide dimming range. Also, the minimum operating current requirements of the electronic transformer can be met so as to avoid LED load flashing.

In particular embodiments, the trigger period (e.g., about 1 ms) of the enable trigger signal can be set according to requirements of the user. Accordingly, the reference voltage of the dimming signal generating circuit can be set to enable the charging time of the capacitor to be longer than 1 ms.

In one embodiment, a method of driving a dimmable LED, can include: (i) receiving an AC voltage to obtain a DC voltage signal through a silicon-controlled rectifier (SCR), an electronic transformer, and a rectifier bridge; (ii) generating an input current and a first output voltage using the DC voltage signal, where the input current is generated as a square wave signal during an on time of the SCR, and the input current is maintained as substantially zero during an off time of the SCR; (iii) generating a dimming signal from the input current; (iv) generating a constant output current signal using the first output voltage, an LED load current signal, and the dimming signal; and (v) where, during the on time of the SCR, a peak of the input current is a substantially constant value that satisfies a minimum load current requirement of the electronic transformer, and a valley of the input current is substantially zero.

Figure 8:
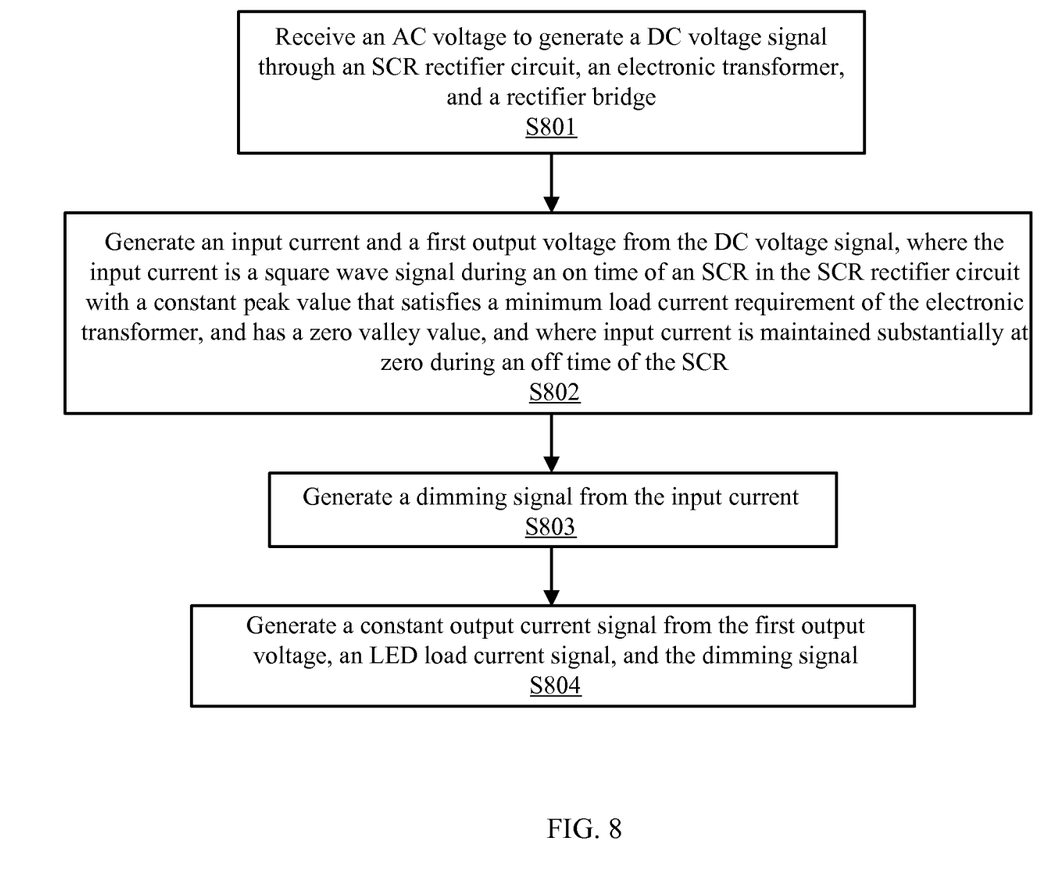
FIG. 8 shows a flow diagram of an example method of driving a dimmable LED, in accordance with embodiments of present invention.

Referring now to FIG. 8, shown is a flow diagram of a method of controlling dimming in an LED driver, in accordance with embodiments of the present invention. At S801, an AC voltage can be received, and a DC voltage signal can be generated after being processed by an SCR rectifier circuit, an electronic transformer, and a rectifier bridge. At S802, the DC voltage signal can be received to generate a first stage input current and a first output voltage. The input current in the SCR rectifier circuit can be a square wave signal during the on time of the SCR, and the peak can be a substantially constant value to meet minimum load current requirements of the electronic transformer, while the valley or low value of the square wave signal can be zero. During the off time of the SCR, the input current can be maintained at zero.

At S803, a dimming signal can be generated from the input current (e.g., via dimming signal generating circuit 62). At S804, a constant output current signal can be generated from the first output voltage, an LED load current signal, and the dimming signal. Step S802 can also include receiving the first stage input current and a first reference current to generate a current control signal. For example, the first reference current can correspond to the peak of the square wave signal. The first output voltage and a first reference voltage can be used to generate a voltage control signal, and a first control signal can be generated from a current control signal and a voltage control signal.

In addition, S802 can also include comparing the first stage input current with the first reference current to generate a current control signal. The first output voltage and the first reference voltage may be utilized to produce a hysteresis comparison signal by a hysteresis comparator, and the hysteresis comparison signal can be a voltage control signal. A reset signal can be generated after an OR logic operation according to the current control signal and the voltage control signal. The reset signal and a first clock signal can be utilized to generate the first control signal.

Step S802 can also include receiving the first stage input current and the first reference current to generate a first error voltage signal. The first error voltage signal can be compared with a voltage signal that represents the inductor current in the first power stage circuit, to generate the current control signal. The first output voltage can be compared with the first reference voltage to generate voltage control signal. The current control signal can be received as a reset signal, and a second clock signal can be received as a set signal, to generate a second trigger signal. A voltage control signal can be received as a reset signal, and an enable trigger signal can be received as a set signal, to generate a third trigger signal. The second and third trigger signals can be used for generating the first control signal after a logic operation.

Step S803 can also include receiving the output current of the first stage and a threshold current to output second square wave signal that represents the conducting angle information of the SCR. The second square wave signal and a second reference current can be utilized to generate a relatively smooth dimming signal that represents the conducting angle information of the SCR by averaging the second reference current according to the second square wave signal.

Described herein are example dimmable LED drivers and driving methods. However, particular embodiments are amenable to various implementations of the input current control circuit, the dimming signal generating circuit, and output current control circuit. Those skilled in the art will recognize that other circuit structures with the same or similar functions can also be applied in the above-described examples in accordance with embodiments of the present invention.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A dimmable light-emitting diode (LED) driver, comprising:
   a) a silicon-controlled rectifier (SCR), an electronic transformer, and a rectifier bridge configured to convert an AC voltage to a DC voltage signal;
   b) a power stage circuit configured to receive said DC voltage signal, and to output a constant current to drive an LED load, wherein said power stage circuit comprises first and second power stage circuits, wherein said first power stage circuit is configured to receive said DC voltage signal, and to generate a first output voltage to said second power stage;
   c) an input current control circuit configured to receive an input current of said first power stage circuit and said first output voltage, and to generate a first control signal to control said input current as a square wave signal during an on time of said SCR, and said input current is maintained as substantially zero during an off time of said SCR;
   d) wherein, during said on time of said SCR, a peak of said input current is a substantially constant value that satisfies a minimum load current requirement of said electronic transformer, and a valley of said input current is substantially zero; and
   e) wherein said LED driver is configured to drive said LED load in accordance with said input current and said first output voltage.

2. The LED driver of claim 1, wherein said input current control circuit further comprises:
   a) a current control circuit configured to receive said input current and a first reference current, and to generate a current control signal, wherein said first reference current corresponds to said peak value of said square wave signal;
   b) a voltage control circuit configured to receive said first output voltage and a first reference voltage, and to generate a voltage control signal; and
   c) a logic circuit configured to receive said current control signal and said voltage control signal, and to generate said first control signal through a logic operation.

3. The LED driver of claim 2, wherein:
   a) said current control circuit comprises a first comparator having a non-inverting input terminal configured to receive said input current, and an inverting input terminal configured to receive said first reference current, wherein said current control signal is configured to be generated by a comparison of said input current against said first reference current;
   b) said voltage control circuit comprises a hysteresis comparator having a non-inverting input terminal configured to receive said first output voltage, and an inverting input terminal configured to receive said first reference voltage, wherein said voltage control signal is configured to be generated by a comparison of said first output voltage against said first reference current; and
   c) said logic circuit comprises a first OR-gate and a first flip-flop, wherein said first OR-gate is configured to receive said current control signal and said voltage control signal, and wherein an output of said first OR-gate is coupled to a reset terminal of said first flip-flop, and a set terminal of said first flip-flop is configured to receive a first clock signal.

4. The LED driver of claim 2, wherein:
   a) said current control circuit comprises a first transconductance operational amplifier, a first compensation circuit, and a second comparator, wherein said first transconductance operational amplifier is configured to receive said input current and said first reference current, and to generate a first error voltage signal after being compensated by said first compensation circuit;
   b) said second comparator is configured to receive said first error voltage signal and a voltage signal that represents an inductor current in said first power stage circuit, and to generate said current control signal;
   c) said voltage control circuit comprises a third comparator configured to receive said first output voltage and said first reference voltage, and to generate said voltage control signal;
   d) said logic circuit comprises a second flip-flop, a third flip-flop, and a first AND-gate, wherein a reset terminal of said second flip-flop is configured to receive said current control signal, a set terminal of said second flip-flop is configured to receive a second clock signal, and said second flip-flop is configured to output a second trigger signal;
   e) a reset terminal of said third flip-flop is configured to receive said voltage control signal, a set terminal of said third flip-flop is configured to receive an enable trigger signal, and said third flip-flop is configured to output a third trigger signal; and
   f) said first control signal is output from said first AND-gate based on said second trigger signal and said third trigger signal.

5. The LED driver of claim 4, further comprising a first reference current generating circuit configured to receive a reference current source, and to generate said first reference current, wherein:
- a) said reference current source is configured as said first reference current when said square wave signal of said input current of said first power stage circuit is active; and
- b) said first reference current is zero when said square wave signal is inactive.

6. The LED driver of claim 1, further comprising a dimming signal generating circuit having:
- a) a timer circuit configured to receive said input current and a threshold current, and to generate a second square wave signal that represents conducting angle information of said SCR; and
- b) an averaging circuit configured to receive said second square wave signal and a second reference current, and to generate a dimming signal that represents said conducting angle information of said SCR by averaging said second reference current in accordance with said second square wave signal.

7. The LED driver of claim 6, further comprising an output current control circuit configured to receive a current signal of said LED load and said dimming signal, and to generate a second control signal configured to control said second power stage circuit to provide a substantially constant output current signal for said LED load.

8. The LED driver of claim 1, wherein said first power stage circuit comprises a boost topology.

9. The LED driver of claim 1, wherein said second power stage circuit comprises a buck topology or a boost-buck topology.

10. A method of driving a dimmable light-emitting diode (LED), the method comprising:
- a) receiving an AC voltage to obtain a DC voltage signal through a silicon-controlled rectifier (SCR), an electronic transformer, and a rectifier bridge;
- b) generating an input current and a first output voltage using said DC voltage signal, wherein said input current is generated as a square wave signal during an on time of said SCR, and said input current is maintained as substantially zero during an off time of said SCR;
- c) generating a dimming signal from said input current;
- d) generating a constant output current signal using said first output voltage, an LED load current signal, and said dimming signal; and
- e) wherein, during said on time of said SCR, a peak of said input current is a substantially constant value that satisfies a minimum load current requirement of said electronic transformer, and a valley of said input current is substantially zero.

11. The method of claim 10, wherein said generating said input current and said first output voltage further comprises:
- a) generating a current control signal using said input current and a first reference current, wherein said first reference current corresponds to said peak of said square wave signal;
- b) generating a voltage control signal using said first output voltage and a first reference voltage; and
- c) generating a first control signal by performing a logic operation on said current control signal and said voltage control signal.

12. The method of claim 11, further comprising:
- a) generating said current control signal by comparing said input current against said first reference current;
- b) generating a hysteresis comparison signal by a hysteresis comparator receiving said first output voltage and said first reference voltage, wherein said hysteresis comparison signal is configured as said voltage control signal;
- c) generating a reset signal after an OR logic operation based on said current control signal and said voltage control signal; and
- d) generating said first control signal using said reset signal and a first clock signal as a set signal.

13. The method of claim 11, further comprising:
- a) generating a first error voltage signal using said input current and said first reference current;
- b) generating said current control signal by comparing said first error voltage signal against a voltage signal that represents an inductor current in a first power stage circuit;
- c) generating said voltage control signal by comparing said first output voltage against said first reference voltage;
- d) generating a second trigger signal by using said current control signal as a reset signal and a second clock signal as a set signal;
- e) generating a third trigger signal by using said voltage control signal as a reset signal and an enable trigger signal as a set signal; and
- f) generating said first control signal after performing a logic operation on said second trigger signal and said third trigger signal.

14. The method of claim 13, further comprising receiving a reference current source, wherein:
- a) when said square wave signal that represents said input current is active, said reference current source is configured as said first reference current; and
- b) when said square wave signal is inactive, said first reference current is zero.

15. The method of claim 13, wherein said generating said dimming signal further comprises:
- a) generating a second square wave signal that represents conducting angle information of said SCR based on said input current and a threshold current; and
- b) generating said dimming signal representing said conducting angle information of said SCR by averaging said second reference current according to said second square wave signal.

* * * * *